United States Patent
Park et al.

(10) Patent No.: US 6,295,061 B1
(45) Date of Patent: Sep. 25, 2001

(54) COMPUTER SYSTEM AND METHOD FOR DYNAMIC INFORMATION DISPLAY

(75) Inventors: Eun Kyoung Park; Jun Ho Cho, both of Seoul (KR)

(73) Assignee: DBM Korea, Seoul (KR)

( * ) Notice: Subject to any disclaimer, the term of this patent is extended or adjusted under 35 U.S.C. 154(b) by 0 days.

(21) Appl. No.: 09/450,653

(22) Filed: Nov. 30, 1999

(30) Foreign Application Priority Data

Feb. 12, 1999 (KR) ........................ 99-5141
May 21, 1999 (KR) ........................ 99-18413

(51) Int. Cl.[7] ........................ G06F 3/14
(52) U.S. Cl. ........................ 345/339; 345/358
(58) Field of Search ........................ 345/326, 329, 345/333, 334, 335, 339, 340, 347, 348, 349, 358, 145; 709/203, 217, 218, 219

(56) References Cited

U.S. PATENT DOCUMENTS

| | | | |
|---|---|---|---|
| 5,481,278 | * | 1/1996 | Shigematsu et al. ............... 345/179 |
| 5,596,694 | * | 1/1997 | Capps ............... 345/473 |
| 5,710,897 | * | 1/1998 | Schneider ............... 345/334 |
| 5,737,619 | * | 4/1998 | Judson ............... 707/500 |
| 5,740,549 | * | 4/1998 | Reilly et al. ............... 705/14 |
| 5,745,719 | * | 4/1998 | Falcon ............... 345/358 |
| 5,801,698 | * | 9/1998 | Lection et al. ............... 345/347 |
| 5,995,102 | * | 11/1999 | Rosen et al. ............... 345/339 |

FOREIGN PATENT DOCUMENTS

WO 99/00723 * 1/1997 (WO) .

* cited by examiner

Primary Examiner—Crescelle N. dela Torre
(74) Attorney, Agent, or Firm—Nath & Associates PLLC; Harold L. Novick

(57) ABSTRACT

A system and method which dynamically and interactively displays information, such as advertising messages, in an intelligent artificial form by responding to a user's pointing device movement or activity. The pointing device activity by the user is analyzed in real-time and displays intended information and/or images near the pointer in real-time by employing layer technology. Other effects provided in response the pointing device movement or activity include disappearance, reappearance, dropping to the corner of the screen, etc of the information and/or image as the pointer is shook or moved in a certain shape by the user. These effects attract potential customers or clients by providing the various features disclosed in the invention under the Internet environment through web-sites.

63 Claims, 15 Drawing Sheets

HTML PAGE — 20

```
<HTML>
  •
  •
  •
<HEAD>
  •
  •
  •
<SCRIPT>
```

JAVASCRIPT PROGRAM — 28

```
</SCRIPT>
</HEAD>
  •
  •
  •
```

<LAYER ...> — 21    LAYER CONTROL MODULE — 25
    <IMG ...>    IMAGE INFORMATION
</LAYER>

•
  •
  •

`<SCRIPT><!-- window.onload=setup; //--> </SCRIPT>` — 32

```
</BODY>
</HTML>
```

FIG. 8

COMPUTER SYSTEM AND METHOD FOR DYNAMIC INFORMATION DISPLAY

BACKGROUND OF THE INVENTION

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

1. Field of the Invention

The present invention relates to computer network systems and methods for displaying information. In particular, the present invention is drawn to dynamically and interactively displaying information in response to the movement of a pointing device such as a mouse or a trackball.

2. Description of the Prior Art

The number of Internet users is growing at an astronomical pace. Because of this growth, it is becoming essential for companies, regardless of their core business, to create a company web site and to advertise on the World Wide Web (WWW). Consequently, on-line advertising through the Internet has emerged as one of the most effective ways to communicate with potential consumers. Currently, a number of different advertising methods for sending information to attract potential consumers through the Internet is available.

FIG. 1 is a computer monitor screen printout that illustrates an advertising method called banners, commonly referred to as "banner ads," which is one of the most common forms of advertising on the Internet. Since banner ads are usually provided in the form of a "hyperlink," Internet users must click on banner ad areas to retrieve more information about an advertisement. Banner ads are stationary and a number of different ads can be randomly located in any vacant area of a computer screen. Most net users or netizens tend to ignore the banner ads because of the time it takes to click on the banner ad areas to get more information about the advertisement. Moreover, since there can be a large number of banner ads present in a web site, the banner ads occupy a lot of space on the computer screen. This in turn reduces the amount of available space for the main content of the web site.

Another common form of sending information to potential consumers through the Internet is a method called "frames," which was introduced by leading web navigating programs and browsers such as Microsoft's Internet Explorer and Netscape's Navigator. FIG. 2 is an illustration of a computer screen having frames used for displaying information. Unlike banner ads, frame advertisements take a portion of a computer screen and create separate windows for displaying an advertisement. In other words, the computer screen is divided into two or more windows thereby decreasing the size of the window intended to include the main content of the web site. Thus, frames take a lot of space away from the main content of the web site. It is also noted that additional time must be used to generate multiple windows in order to display advertisements using the frame method, and that adds to the total time it takes to load the main content of the web site. Therefore, a lot web sites do not currently utilize the frame method and many that do utilize it at all have minimized the area of the advertisement window.

FIG. 3 is an illustration of a computer screen depicting an additional form of advertising through the Internet called "pop-ups" or "self-appearing windows," which appear on the computer screen regardless of a user's intention. Because this form of advertisement appears by itself and blocks a substantial part of a user's working window, it can annoy users and induce negative responses from the potential consumers. Moreover, since pop-ups can be simply eliminated from the working window if a user resizes or drags the pop up to another part of the window, pop-ups, as an advertisement tool, do not leave a lasting impression on potential consumers.

More recently a product called "Comet Cursor" was introduced by a company named Comet Systems, Inc. This product is illustrated in FIG. 4 and is described in PCT application number PCT/US98/12538, claiming priority on U.S. patent application Ser. No. 08/882,580 filed Jun. 26, 1997, incorporated herein by reference. Comet Cursor transforms the image of a pointer or cursor into advertisement information to attract potential consumers through the Internet. Although Comet Cursor tries to resolve problems existing in the previous forms of advertisement discussed above, it still has drawbacks that need to be addressed. Comet Systems' main object is to modify the cursor, referred to as the cursor image, to a shape or form of a specific image displayed on a screen as a result of the position of the cursor on the screen. However, the major drawback of this system is that the image of the cursor changes regardless of the user's intention. The image of the cursor simply changes in response to the location of the cursor on the screen. Another notable drawback is that once the operation of the image change is activated, the user cannot stop the activation of the advertisement information and can become annoyed and lose interest in the information being displayed. It is further noted that since the cursor changes form, it is difficult for the user to be sure which objects are being selected by the cursor. In addition a cursor display area is only 32 pixels×32 pixels, thus limiting the area available to display information. In some cases the cursor display area will be too small to display all of the desired or necessary information. Finally, a separate program called a Plug-in must be installed in order to receive the benefit of the service from the Comet Cursor. Therefore, the user will not only be annoyed and lose interest in the advertisements because of the reasons explained above, but will also be burdened with the installation of the Plug-in program.

A system by Apple Computer Company displays information using help bubbles and is disclosed in U.S. Pat. No. 5,287,448 incorporated herein by reference. In this system the MAC Operating System, which implements a graphical user interface, displays help information through the use of help bubbles. When the cursor points to or selects an object, a help bubble appears on the screen displaying help information corresponding to the object selected by the cursor. The help bubble is located near the cursor, but is only displayed when the cursor points to or is selecting a specific object. When the user moves the cursor to another object, the help bubble is no longer displayed. Therefore, the help information will not be displayed unless a specific object is selected. It is further noted that it is impossible to disable the display of a help bubble once it is viewed without entirely disabling the display of all help bubbles.

SUMMARY OF THE INVENTION

An object of the present invention is to provide a system which solves the above-mentioned drawbacks. The present invention utilizes only a small portion of the user's working window and displays information, such as advertising information according to the activity or movement of a pointing device or cursor thereby minimizing any annoyance or irritation that the displayed information can cause and maximizing the advertising effect. For instance, if the cursor is moving in a downward direction the information can be displayed above the pointer so that the user can read text below the pointer. Also, if the pointer is moved in a circular direction this can signal that the displayed information should disappear or be moved to a corner of the screen away from the working window. Finally the present invention is operable without the need for any additional installation of separate programs such as Plug-ins.

It is a further object of the present invention to provide a dynamic and interactive displaying system where information is associated with a cursor and is displayed by using the techniques of artificial intelligence to analyze the user's cursor movement and/or activity.

It is further an object to provide a dynamic and interactive displaying system where information is associated with a cursor and is displayed near the cursor at a certain distance in response to the user's movement of the cursor.

It is also an object to provide a dynamic and interactive displaying system where displayed information, including images and sound, is associated with a cursor and disappears as the user moves the cursor in a predetermined movement, such as shaking or oscillating the cursor by moving the pointing device horizontally.

It is also an object to provide a dynamic and interactive displaying system where the displayed information, including images, reappear after predetermined time.

It is yet another object to provide a dynamic and interactive displaying system where the displayed information, including images, disappears after the pointer is moved in a predetermined motion such as a circular motion.

It is another object to provide a dynamic and interactive displaying system where the displayed information, including images, drops to a preselected portion of a screen such as a corner.

It is also an object to provide a dynamic and interactive displaying system where the displayed information, including images, has movements on the screen such as jumping toward the cursor.

It is a further object to provide a dynamic and interactive displaying system where the displayed information, including images, changes its visibility, such as simply disappearing after a predetermined time period.

It is another object to provide a dynamic and interactive displaying system where the displayed information, including images, changes to give a multiple advertising effect.

It is yet another object to provide a dynamic and interactive displaying system where the displayed information include images, which follow a cursor from the opposite direction of the pointer's moving direction.

It is further an object to provide a dynamic and interactive displaying system where the displayed information includes images which follows a pointer for a certain distance in response to the speed at which the pointer moves.

Accordingly, the present invention is a system and method for dynamically and interactively displaying information including images near a pointer or cursor in response to the movement or activity of a pointing device. Moreover, the system and method disclosed in the present invention can further include the analysis on different shapes and sizes of the motion of a pointing device made through a user's pointing device activity and different methods for displaying the information to enhance the advertising effects.

Furthermore, the present invention does not require any additional installation of a program, such as a Plug-in to receive the benefit of the features disclosed by this invention.

Although the present invention is described in the context of a conventional Internet environment, its teaching can be applied in a broader scale to include any computer system. Furthermore, the present invention can be applied in a multimedia environment to include sound effects to communicate with users linked with the displaying information and/or images.

The system of the present invention allows any entity to send or transmit information including images to any remote user or client by displaying such information in response to the remote user's or client's pointing device movement or activity.

According to one aspect of the system in the present invention, when a user or client visits and browses through a company's web site, the company can place its logo or any brand it has near the pointer to attract potential consumers. More importantly, the information and/or image reacts to cursor activity or movement in a manner that minimizes any discomfort or annoyance, which can be experienced by the user. For instance, in one of the embodiments when the user causes the cursor to shake or have reciprocal movements horizontally, the information and/or image disappears or drops to the lower corner of the screen. The embodiments further include features, such as having information and/or images disappear after making a circular trip around the pointer or jump back near the pointer from a dropped position on the monitor screen such as at the lower corner of the screen, to remind or re-attract the user's attention.

The present invention further includes other features as discussed in the above in the effort to resolve drawbacks and disadvantages in the previously existing methods and apparatuses for displaying information and images for the entities to send messages to their targeted potential clients and customers.

BRIEF DESCRIPTION OF THE DRAWINGS

FIG. 8 is a chart which depicts an overall arrangement of source code for the preferred embodiment of this present invention.

DETAILED DESCRIPTION OF PREFERRED EMBODIMENT

Figure 1:
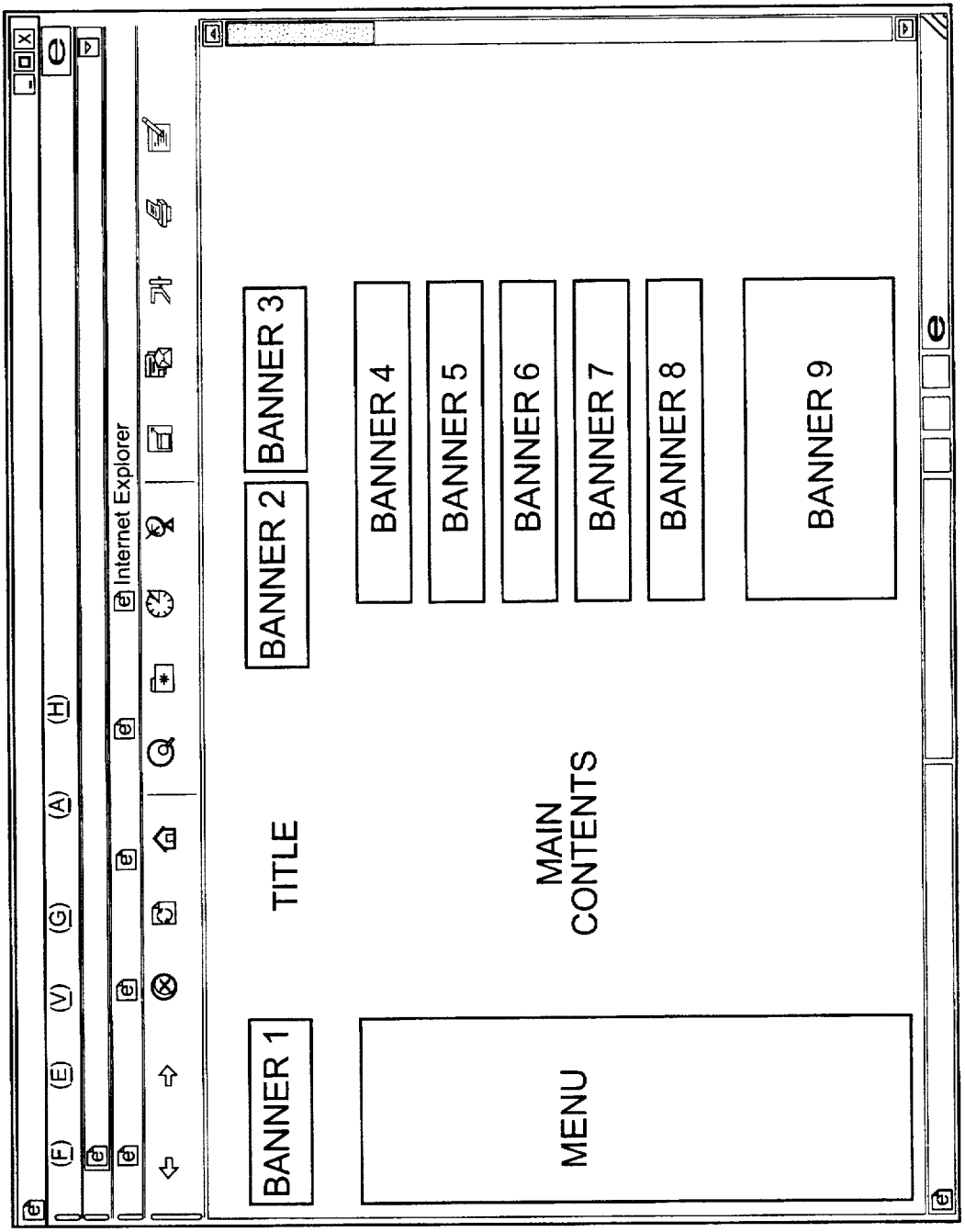
FIG. 1 is a computer monitor screen printout that depicts an example of conventional banner advertisements, or "banner ads".
Figure 2:
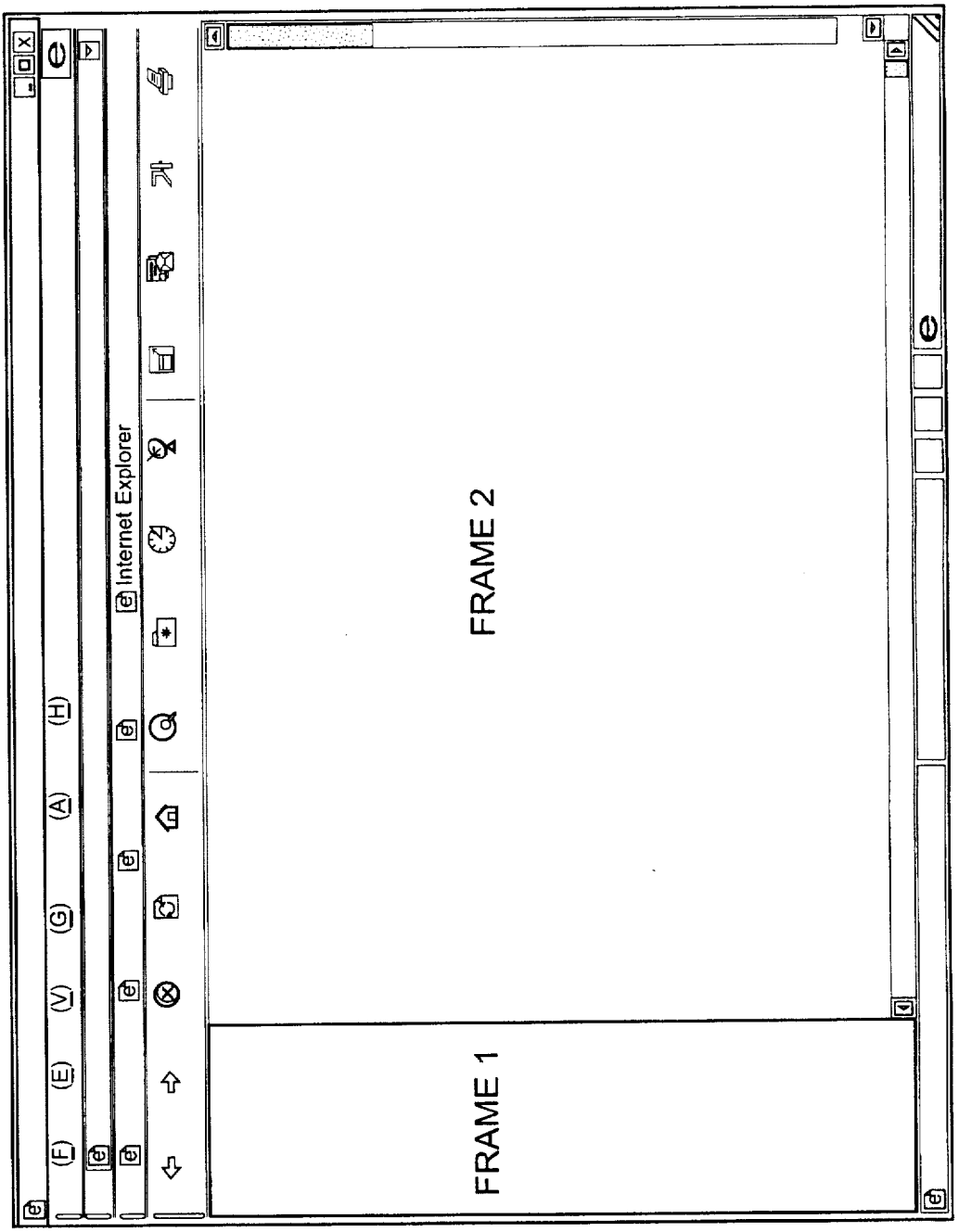
FIG. 2 is a computer monitor screen printout that depicts an example of "Frame" advertisements.
Figure 3:
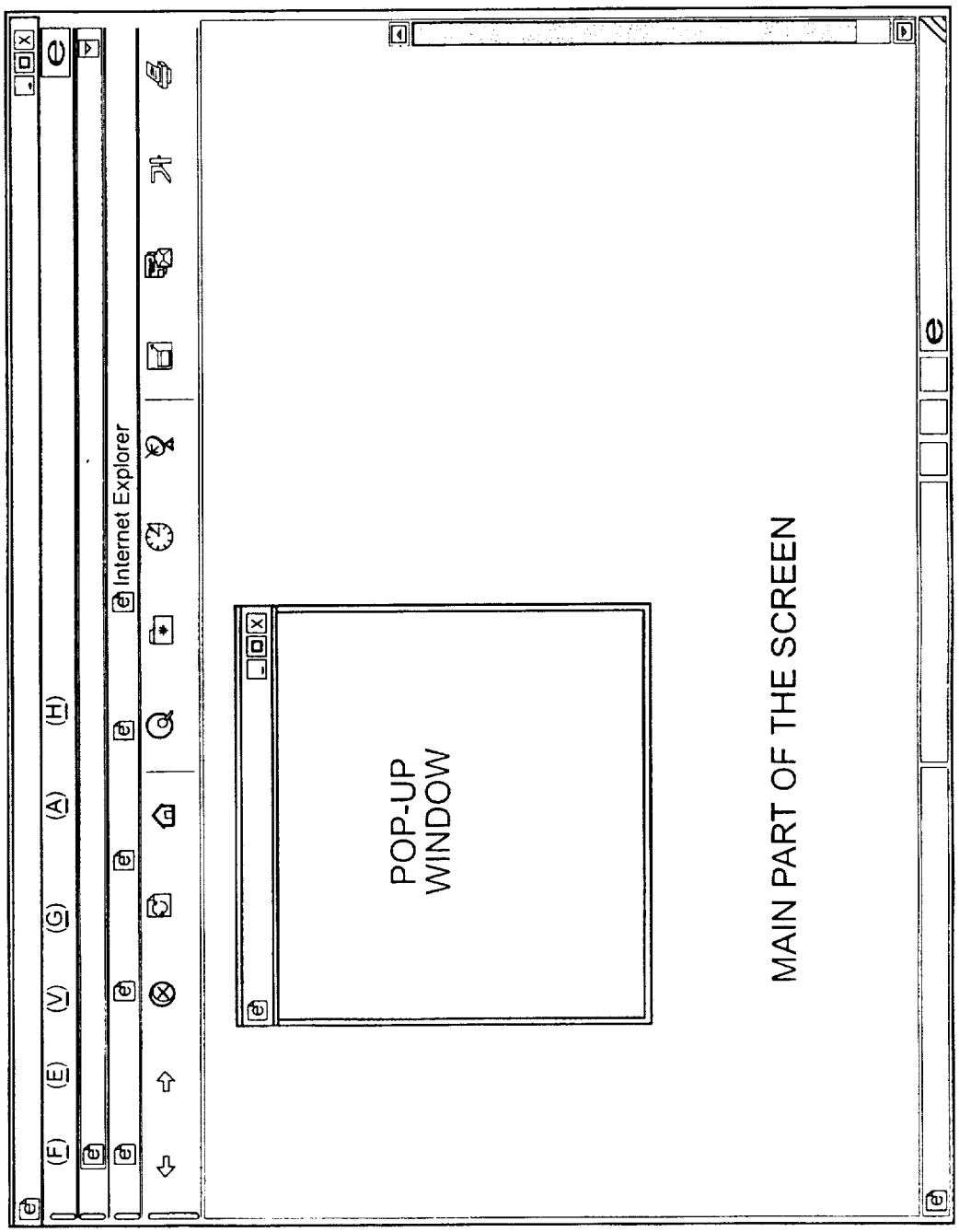
FIG. 3 is a computer monitor screen printout that depicts an example of "pop-up" or "self-appearing" advertisements.
Figure 4:
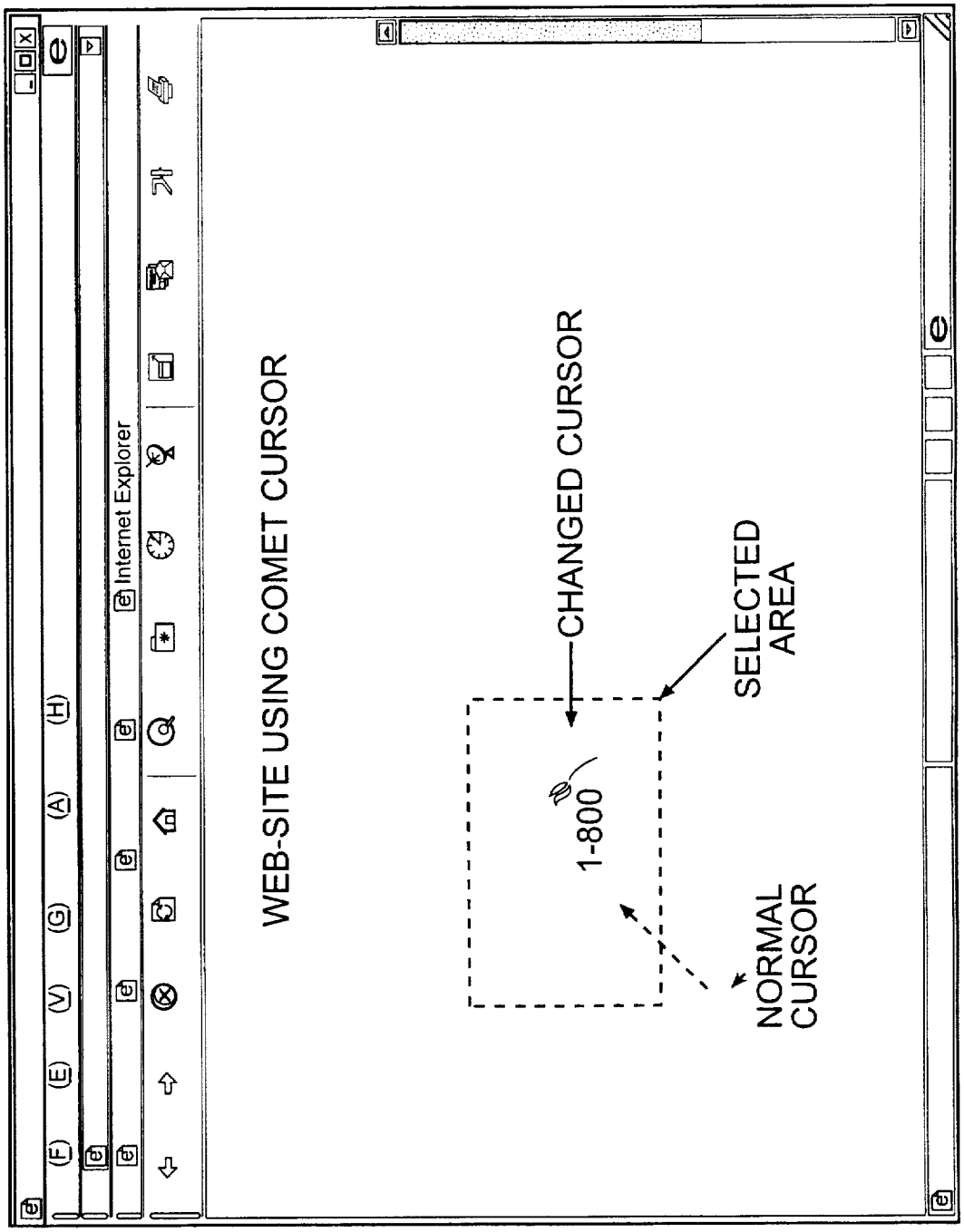
FIG. 4 is a computer monitor screen printout that depicts an illustration of a "Comet Cursor" provided by Comet Systems as disclosed in published PCT application PCT/US98/12538.
Figure 5:
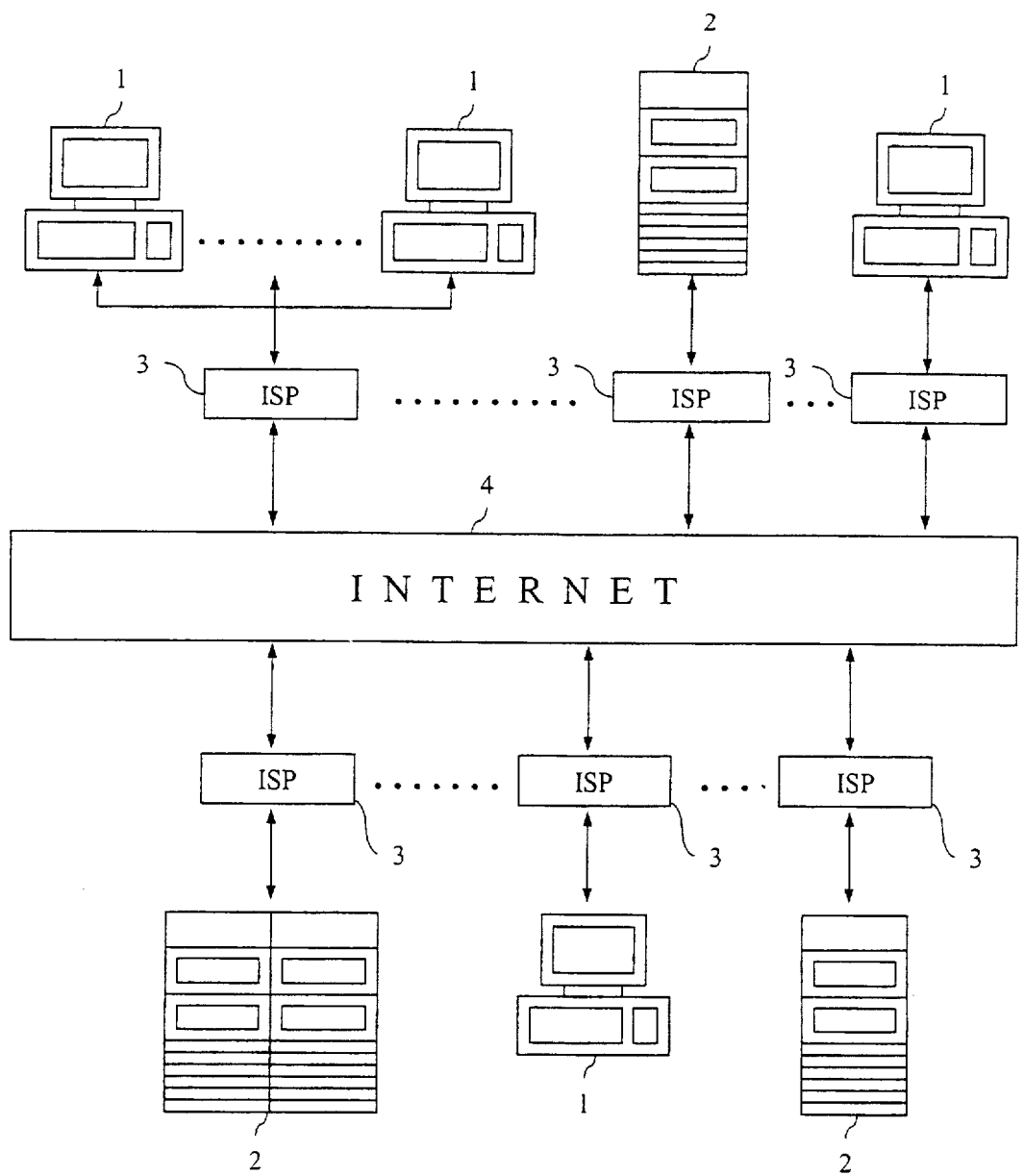
FIG. 5 is schematic block diagram of an exemplary Internet network environment based on a client-server model.

The present invention is now described with reference to the drawings in which like elements are designated by like numerals throughout the several views. FIG. 5 shows a general client-server model based on a computer network such as the Internet. As indicated in FIG. 5, a number of "client computers" 1 (or user terminals) and "server computers" 2 are interconnected through an Internet Service Provider 3 to a global computer network such as a conventional Internet 4. Each of the client computers 1 is connected to Internet 4 and receives desired services from server computer 2. These client computers 1 can be individual personal computers or terminal connections to a Local Area Network (LAN) or a Wide Area Network (WAN).

Applications written to be used in the Internet environment on the World Wide Web (WWW) are often written in Hyper Text Markup Language (HTML). The communications protocol used is Hyper Text Transfer Protocol (HTTP). The advantage of using HTML is that HTML provides text, graphics, sound, video etc. in formats suitable for implementing in a Graphic User Interface (GUI). In this way the World Wide WEB ("WWW" or "the WEB") is used for the transmission of a vast amount of information between client computers and server computers.

Each of the client computers 1 can conventionally browse or navigate through WWW via application programs called "WEB browsers", such as Internet Explorer by Microsoft Inc., or Navigator or Communicator by Netscape Inc. The WEB browsers basically perform two functions. First, the WEB browser transfers HTML documents from a server that provides a HTML service (called "WEB site") to the client computer. Second, a WEB browser interprets the transferred documents to be displayed in GUI format to an address on the WWW called a Unified Resource Locator (URL).

More recently, WEB browsers are beginning to provide many flexible and powerful functions. These functions emerged through technologies such as "plug-ins", "script languages", "virtual machines" etc. Such functions can be utilized by simply including the script language in the HTML page or by providing a separate application in the form of a dynamic linked library (DLL). Moreover, both techniques can be used together to provide better service than most WEB browsers. For example, the combination of techniques can allow a complicated computation to be processed in real-time and can also make it possible to display an intricate animation sequence. The combination of techniques further makes it possible to create a new database or connect to a preexisting database to be subsequently utilized on the WWW.

The present invention implements the use of "script language" as its core technology among the other techniques available. More particularly, the present invention provides a browser independent function since it is implemented using "jscript" by Microsoft Inc. and "javascript" by Netscape Inc. This technology uses direct insertion of a program written in script within the HTML page. The program can then be statically linked by a corresponding script interpreter when the WEB browser reads the HTML. The background technology of the present invention is, but not limited to, DHTML and script language. However, it is possible that a person of ordinary skill in the art can easily implement such functions as described in the present invention using other techniques such as "Plug-ins," based on Active X technology provided by Microsoft Inc. or independent therefrom, or "Java language" etc. Thus, the present invention can be further accomplished by using other developing techniques.

Figure 6:
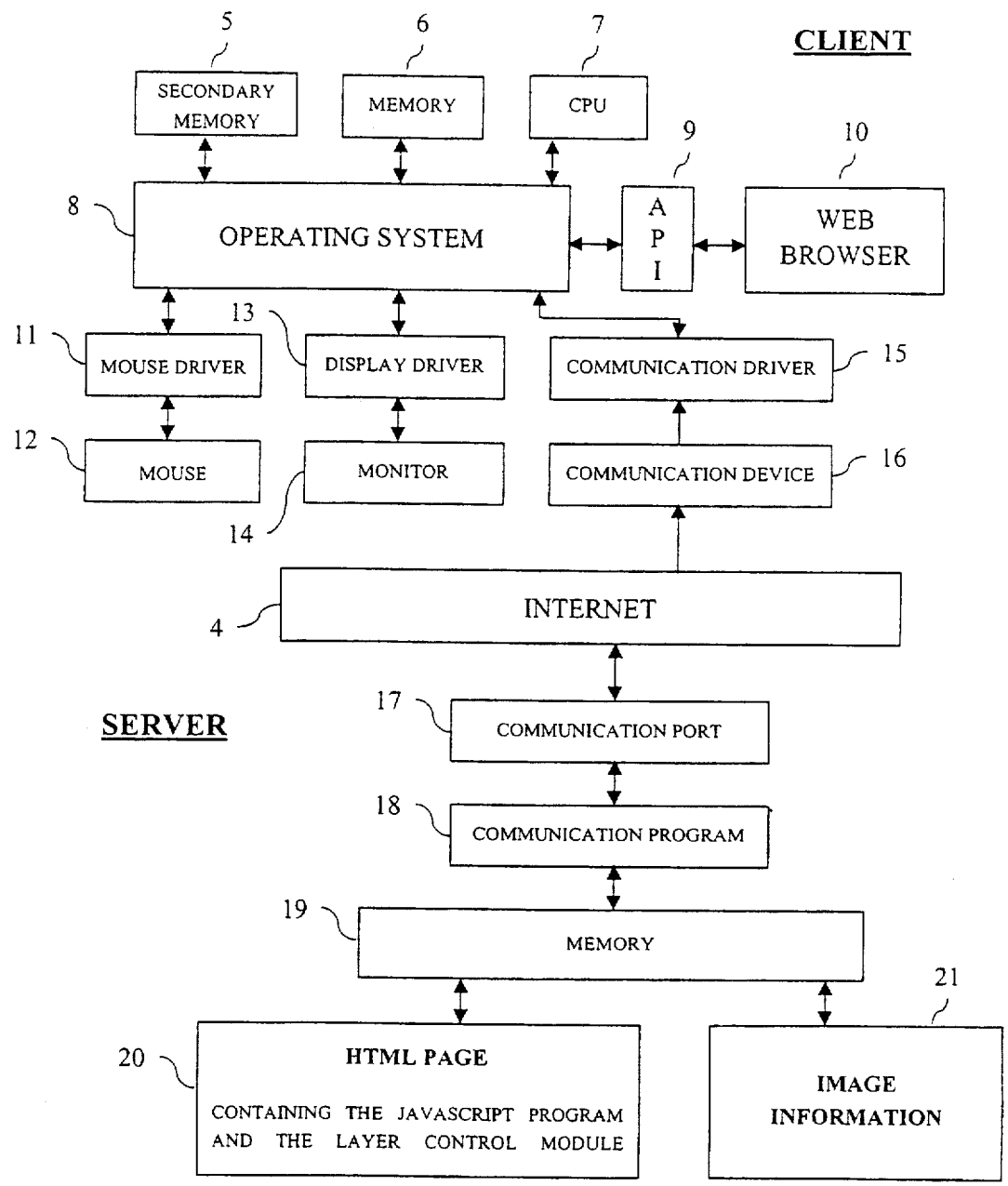
FIG. 6 is a schematic block diagram of a client-server system including client computers and server computers connected via the Internet.

FIG. 6 shows a diagram of a client-server system including a client computer and a server computer which are connected via Internet 4. For the ease of understanding, unnecessary steps or components have been omitted therefrom. A network layer model including the network protocol of TCP/IP and lower parts of other network layers, and devices constituting the client computer, such as audio, keyboard etc. are not shown for simplicity sake.

Generally, the client computer system, which the remote user employs, is provided with a number of conventional hardware components and conventional software packages. The hardware components include a secondary memory 5, a memory 6 and a CPU 7. An operating system (OS) 8 is linked to each of these hardware components and manages them. In addition, OS 8 is bi-directionally linked to an Applications Program Interface (API) 9. A web browser 10 is also bi-directionally linked to API 9 for interpreting information.

The client computer is further provided with a number of user interfaces including a pointing device driver 11 linked to a pointing device 12, a display driver 13 linked to a monitor 14, and a communication driver 15 linked to a communication device 16. Each of the drivers is linked to OS8 which manages the operation of the devices and monitor.

Communications device 16 is linked to Internet 4. The client computer is linked through Internet 4 to a communications port 17 of the server computer. Communications port 17 is linked to a communications program 18 which in turn is linked to a memory 19. A HTML page 20 and an image information 21 are accessed through memory 19.

Other components of the invention include but are not limited to a hard disk drive (HDD) as a secondary memory device; a keyboard (not shown) or a pointing device 12, most commonly a mouse, as an input device; a monitor 14 or a printing device (not shown) as an output device; and a modem or LAN card etc. as a communication device 16 for transmitting/receiving information to/from networks such as the Internet.

It is noted that OS8 is usually provided to generally manage these hardware components and to provide a desired function through communications with the user. Each of the drivers exchanges inputs/outputs among the corresponding devices and OS 8. The divers also control these inputs/outputs at low levels.

API 9 is comprised of a set of conventional functions which includes basic functions necessary for accessing the hardware components when the application program is being executed. OS 8 manages or executes API 9 and the application programs by storing the frequently used APIs or loading the APIs in memory (static linking) upon the request by the application program (dynamic linking). Subsequently, WEB browser 10 interprets the HTML page 20, which has been transmitted from the server computer. HTML page 20 is stored in the memory of the client computer in conjunction with API 9 and displays information as directed by HTML page 20 on monitor 14. HTML page 20 and image information 21 are in some cases stored in memory 19 of the server computer.

Figure 7:
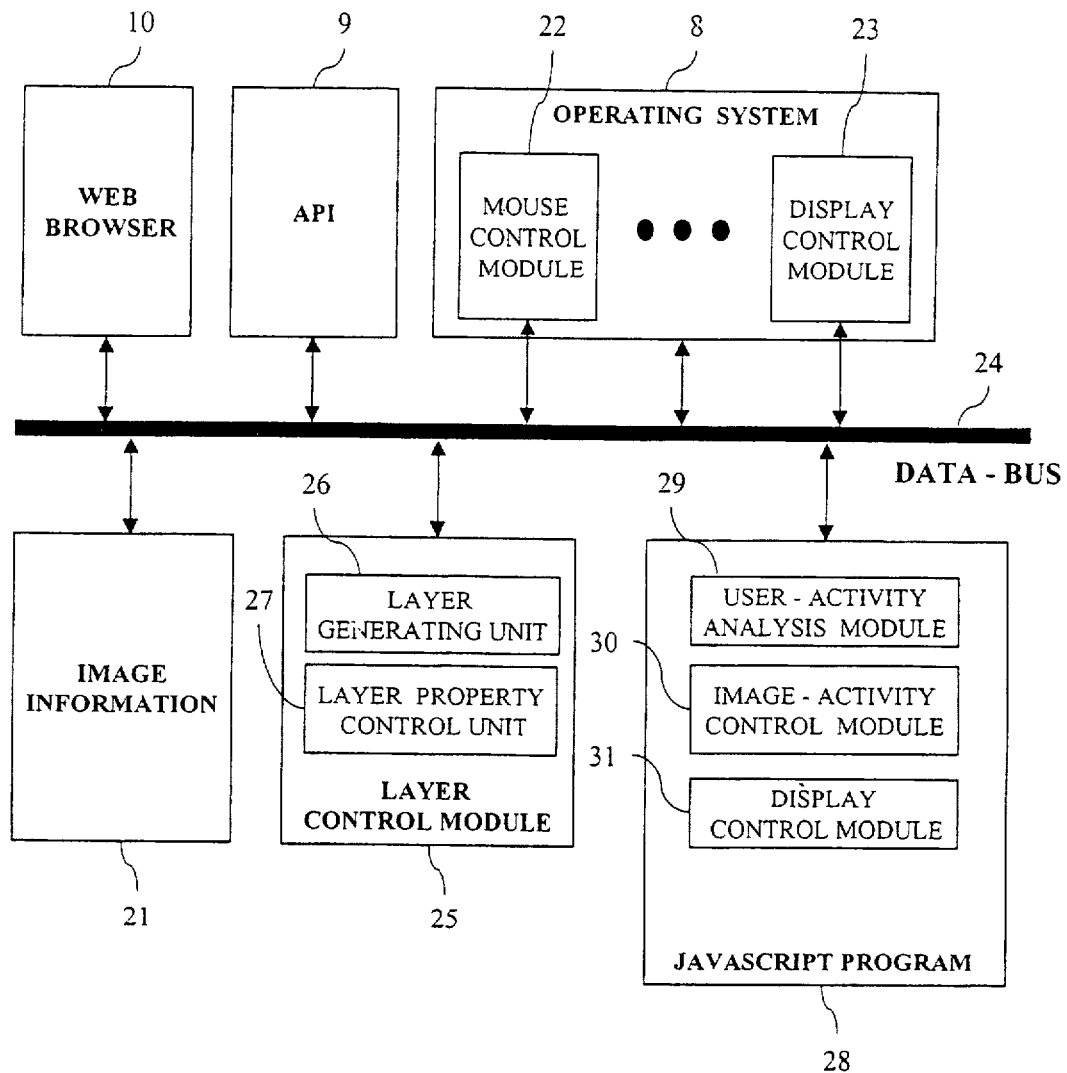
FIG. 7 is a simplified schematic block diagram of a data bus in a client computer onto which data are transferred among the basic components of the client computer.

FIG. 7 is a simplified diagram of a data bus in a client computer that depicts operating system 8 of the client computer as having a pointing device module 22 and a display control module 23 all being linked to a data bus 24. The client computer includes all the elements located above data-bus 24.

All elements located below data-bus 24 are included in the server computer. In addition to image information 21, the server computer further includes a layer control module 25 linked to data-bus 24. Layer control module 25 has a layer generating unit 26 and a layer property control unit 27. In addition, the server computer has an artificial intelligence module 28 linked to data bus 24. Artificial intelligence control module 28 includes a user-activity analysis module 29, an image activity control module 30 and a display control module 31.

HTML page 20 can include Artificial Intelligence Control Modules and Layer Control Modules which can be written in javascript or any other languages available.

As shown in FIG. 7, image information 21 is stored as a separate file. However, within the artificial intelligence control module 28, image information 21 can be included in the same file or can be stored in a separate file. HTML page 20 and image information 21 can also be stored together in the same file or separate files. These three files, namely the artificial intelligence control module 28, layer control module 25 and image information 21, can be stored on a single independent server or different combinations of separate servers. Therefore, various combinations are possible other than the specific construction shown in FIG. 7.

The three files, i.e. artificial intelligence control module 28, image information 21 and HTML page 20, are transmitted to the client computer's memory via communication port 17, FIG. 6, using communications program 18 located on the server computer. The client computer receives the three files through communications device 16, stores the three files in memory 6 of the client computer and analyzes the three files using WEB browser 10 which also displays the information on monitor 14.

Communication port 17 on the server computer represents a typical conventional transmit/receive input to and from Internet 4. Communication program 18 represents a Server Application Program that provides the function of receiving/transmitting the HTML page 20 via the communication port 17. Also, image information 21, in which images are stored in the form of files, includes all the representable messages or advertising materials. The advertising materials are capable of being represented as images and can include a logo of the company, text representing an explanation of the goods or a brand name, images of goods or products to be sold etc. It is noted that since the advertising materials can exist in various forms, the present invention is not limited to the forms of advertising disclosed in this application.

The file format of each file can be implemented using compression technology such as GIF, TIF, JPG, etc. which are all well known in the art and are not directly related to the present invention. In addition, it should be noted that the image information can be stored as a single file or a plurality of files. More particularly, storing the information to be displayed on the monitor of the client computer in a plurality of files this does not affect the implementation of the present invention. In other words, although the actual implementation of displaying an image stored in a plurality of files has been omitted in this disclosure, a person of ordinarily skill in the art can easily implement the appropriate technology in order to display information in accordance with the present invention.

Using the client-server computer system components as described above, the client computer receives the HTML page 20 and image information 21 from the server computer, analyzes the information with the WEB browser, and then displays them on the monitor.

Returning to FIG. 7, there is shown a simplified diagram of data bus 24. The client computer uses data bus 24 to transfer information between basic components of the client computer. As shown in FIG. 7 and as mentioned above, the components located in the lower portion of the data bus 24 are stored in the memory of the client computer and accessed by WEB browser 10 and API 9 under the control of OS 8. Layer control module 25 is included in the HTML page illustrated in FIG. 6, and is used to change the state of the image information or location of information etc.

Layer control is also implemented in web browser 10. Layer technology is now conventional and is one of the core technologies of the recently marketed Dynamic HTML ("DHTML"). Moreover, if a WEB page is developed using the DHTML, it can provide functions such as displaying new content without loading the WEB page again; changing the screen color by clicking a button on the pointing device; and accessing animation without the need to install a Plug-In. That is, layer technology overcomes problems with the conventional HTML document which displays information without communicating with the servers and displays information without any regard to the actions of the user. The new functions provided by DHTML are implemented by using the form control of the style sheet in conjunction with scripts written in script languages such as javascript.

Moreover, the function of the present invention is to control the shape and displacement of the image information which includes information on location represented by an X-Y-Z axes. The X and Y coordinates determine vertical and horizontal positioning on the monitor screen. The Z axis is not an actual physical dimension, but determines which window or layer is active. In a sense the z axis can be thought of as showing depth where the window or layer closest to the user is the active window or layer.

Moreover, the layer control module 25 includes a layer generating unit 26 and a layer property control unit 27. The layer control module 25 creates and defines the property of an image to be displayed using a layer generating unit 26 and a layer property control unit 27. It is noted that the image to be displayed is limited to the region which has been defined by the layer property control unit 27 and such image can be transparent or non-transparent. Furthermore, it is noted that the size of the layer and the location of image to be displayed can be controlled by layer property control unit 27. The Z value can be predetermined regardless of in which order the images are created. As the Z value changes, the image is perceived to be closer to or further from the user. The distance between the user and the image is merely defined in terms of the perception by the user opposed to the physical location of the image. Thus, by defining an appropriate Z value for the image, the possibility of overlapping images can be prevented and any undesired layer can be covered. Furthermore, it is possible to give the same Z values for multiple layers and, depending on the transparency of the layer, the user can see the layer that he or she wishes to access.

Thus, as explained above, properties such as transparency, size, location and depth of the layer can be controlled through an application program or the user. Moreover, this layer technology can be implemented through servers of any type. Particularly, a web browser can be considered as a layer. When using a web browser as a layer, it is suggested that the size and transparency of the layer should not be changed and the Z value should be 0.

In particular, through the use of script language, each layer as defined in a HTML document can be displayed as being overlapped with one another or capable of being repositioned. The use of script language also allows for concealment of the layer and for transparently displaying overlapping layers. The layer control module shown in FIG. 7 provides the above-mentioned functions, and includes a layer generating unit for generating layers on the HTML document and a layer property control unit 27 for storing the state information on the position, visibility etc. of the layer. The present invention uses these units to change the location and state of the static image information by including the image information received from the server computer into the layer control module. The content of the WEB page to which the above procedure is directly applied is controlled by layer control module 25.

In addition, it is noted that the invention as described in the present application is not limited to the particular programming languages or environments discussed or illustrated. Technology such as the layer technology disclosed in this application is merely added to help the reader to understand DHTML and script language. Thus, it must be understood that the invention of the present application can be implemented without directly using the layer technology of DHTML when implemented in the form of a Plug-In using ActiveX technology provided by Microsoft Inc. or implementing layer technology using Java language provided by SUN Co. Therefore, it is noted that the concept of layers, as disclosed in this application, must be understood in terms of the logic being used as opposed to the actual languages being implemented.

Artificial intelligence control module 28, constituting an important portion of the invention of the present application illustrated in FIG. 7, includes three modules 29, 30 and 31. The function of the user-activity analysis module 29 is to analyze the activity of the pointing device occurring on WEB browser 10. A determination is made as to whether the pointing device activity is one of the plurality of predefined activities. The pointing device activity includes standard events such as click, move, drag, etc., which is provided by the OS8 (FIG. 6). Moreover, the pointing device activity further includes a combination of standard events such as a lapse of time regardless of any user's pointing device activity. Further examples of such activities include an X trace with pointing device 12 (FIG. 11), shaking pointing device 12 (FIG. 13), an O trace made by pointing device 12 (see FIG. 10) or various shapes of traces with the pointing device, lapse of certain time, movement of cursor in a certain area within the working window, a scroll of the working window, etc. Thus, the present invention can be easily programed to recognize various forms of activities for implementation.

The image activity control module 30 executes a matching image activity, which corresponds to at least one of a plurality of predefined cursor activities. The matching image activity includes various effects, by which the image disappears (FIGS. 10 and 13); by which the image falls to right lower end (FIG. 12); by which the image is substituted for another image; by which the image circles around the cursor; by which the image follows the cursor in response to the movement of the cursor; by which the image jumps back near the cursor; by which the image maintains a certain distance from the cursor on a side opposite to the direction and/or speed in which the cursor is moving; by which the image scrolls; etc. It is noted that other cursor activities and movements not explicitly disclosed in this application are included in this application and can also be implemented in the invention of the present application.

Display control module 31 takes information from image activity control module 30 and through control module 25 displays layered image information on WEB browser 10.

In the present invention, user activity module 29 and image activity control module 30 can interpret a plurality of cursor activities or a combination of cursor activities to produce a single effect. For example, a cursor moved back and forth in a horizontal direction or a cursor moved in the shape of an X, can be recognized as a single user activity. The effect by which the image disappears or the image falls to a corner of the screen is recognized as a predefined activity by the image activity control module 30. Further, using a combination of the effects, the module can have a function that the image falls at the corner, if for example, the cursor is shaken and that the image disappears if, for example, the cursor is moved in the form of X shape. Also, using another combination, the module can function so that the image disappears if the pointer is shaken and that the image falls if the pointer is moved in the form of X shape. Thus, the present invention can create user-friendly and interactive advertising effects through the use of artificial intelligence by matching various user activities with corresponding image activity control modules.

FIG. 8 shows portions of code which must be inserted into the HTML page of the server computer for implementation of the invention of the present application (Note: the HTML page can be transmitted to the client computer using the Internet). First, the above-mentioned artificial intelligence control module is inserted between <HEAD> and </HEAD> TAG of the HTML page and LAYER CONTROL MODULE 25 is inserted using a pair of <LAYER . . . > and </LAYER> TAG. By including <IMG . . . > TAG into the LAYER CONTROL MODULE 25, insertion of the IMAGE INFORMATION 21 is made possible. Finally, a script starting the artificial intelligence control module is added in front of </BODY> TAG which corresponds to the final portion of the HTML page.

Figure 9:
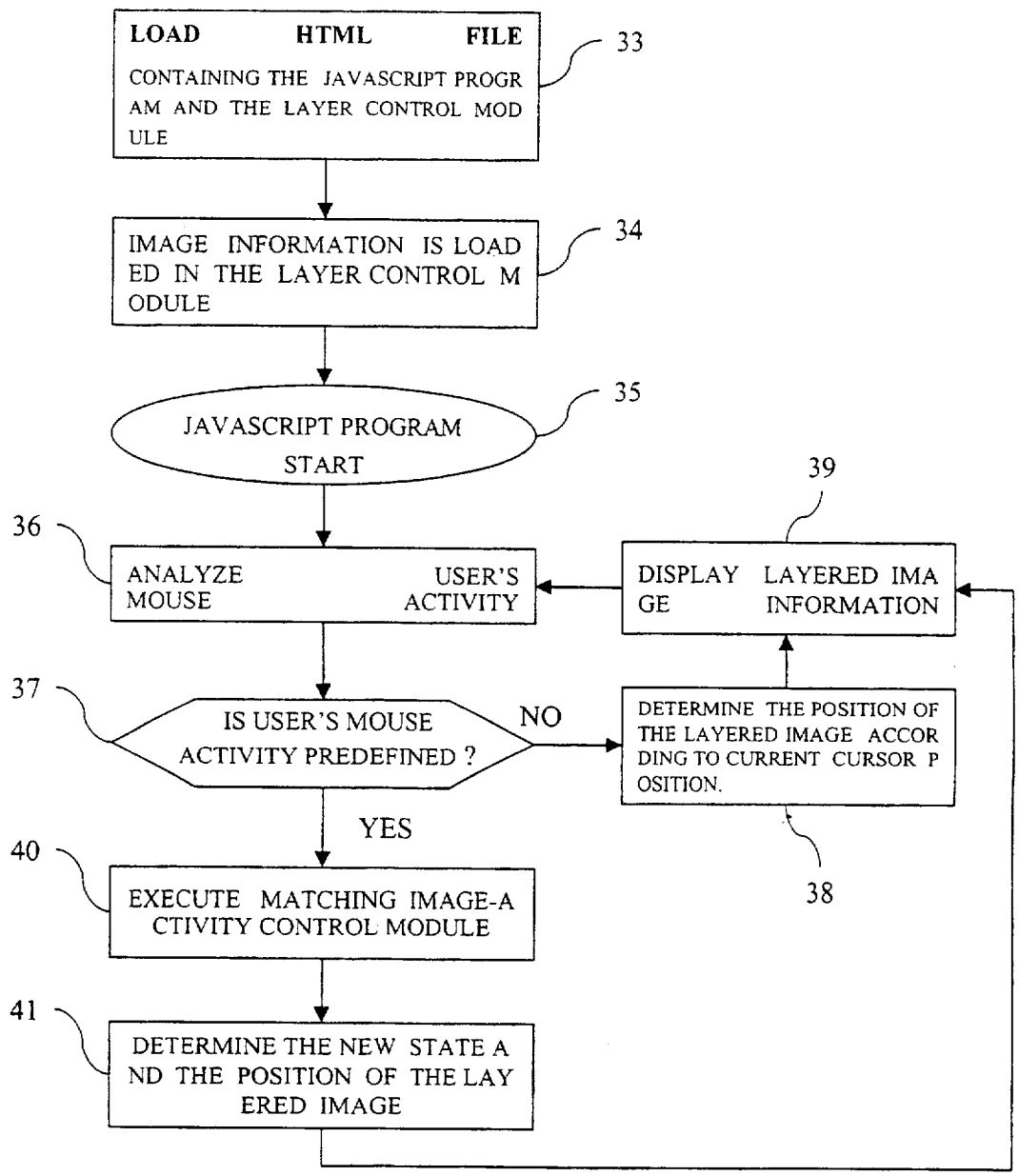
FIG. 9 is a schematic overall flow chart of a preferred embodiment of this present invention.

FIG. 9 shows the preferred embodiment of the invention. More particularly, it shows a flow diagram of a practical implementation of this invention using the HTML page of a web browser transmitted from a server computer. The client computer connects to the web site located on the server computer which provides a HTML page. The client computer loads the HTML page into the memory of the client computer through the Internet. Then, the web browser starts interpreting the HTML page, which is shown in FIG. 8. At the time of interpreting the <LAYER . . . > Tag part of the HTML page in FIG. 8, layer generating unit creates a layer 26 and layer property control unit 27 is initialized. At the time of interpreting the <IMG . . . > Tag command within the layer, image information is loaded from the server computer-URL (Unified Resource Locator). The layer control module is then utilized to control the image information which is also called a "layered image" or "layered image information". <SCRIPT> 32 described in FIG. 8 begins the process and activates the artificial intelligence control module 28. Once artificial intelligence control module 28 is initiated the module operates through the user activity analysis module 29. The pointing device activity in web browser is traced and analyzed in real-time. Based on the direction, distance, speed, etc. of current and previous pointing device activity by the user, user-activity analysis module 29 determines whether such activity by the user is a predefined activity. If the analysis reveals that the activity is not predefined, then the layered image is positioned at a certain distance from the pointer and follows the pointer as a basic service. However, if the analysis reveals that the activity is a predefined activity, then user-activity analysis module 29 searches and executes the matching image-activity control module 30. As previously stated, according to the analysis from user activity analysis module 29, each matching image-activity control module 29 plays a role in controlling and redefining the state and position of the layered image in real-time. The redefined layered image is then displayed on the web browser by using display control module 31.

Because the overall process of this invention includes an analysis of the user's pointing device activity and a plurality of image-activities, such as circular animation of the layered image information; disappearance of the layered image information; etc., and the activity is executed in real-time, the user of the client computer is provided with interactive and dynamic advertisement effects which resolves drawbacks of stationary and anti-user-friendly advertisements. Moreover, it is noted that FIG. 9 does not include every detailed process of each module and interface among the modules because it is believed the invention as described in FIG. 9 is easily understood by one of ordinary skill in the art. Subsequently, the matching layer image is displayed through display control module to users or potential customers.

Figure 10:
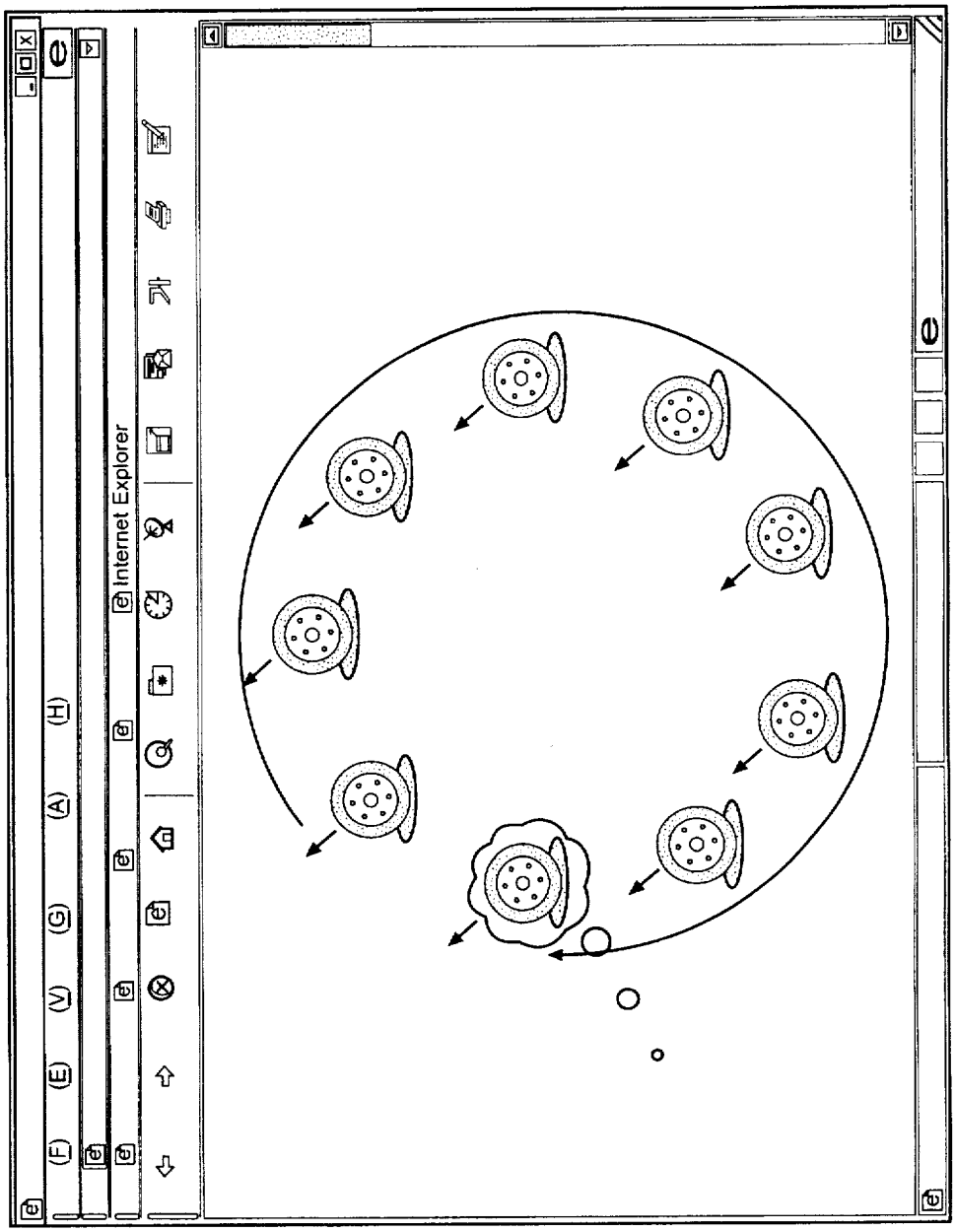
FIG. 10 is a drawing of a computer monitor screen which depicts an embodiment of the invention in which the image disappears after moving the pointer in a circular motion.
Figure 11:
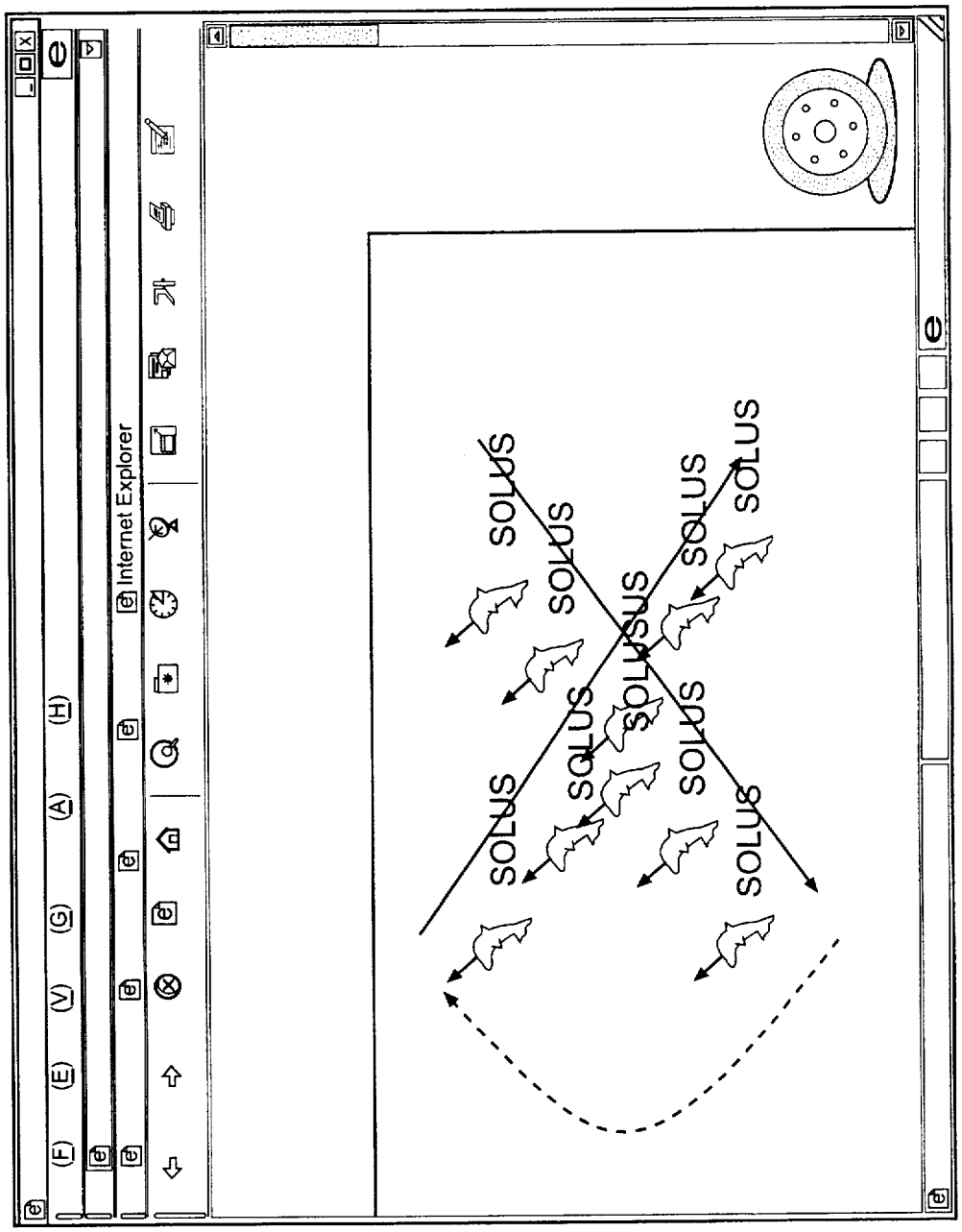
FIG. 11 is a drawing of a computer monitor screen which depicts an embodiment of the invention in which the image disappears after the pointer is moved by making an X trace.
Figure 12:
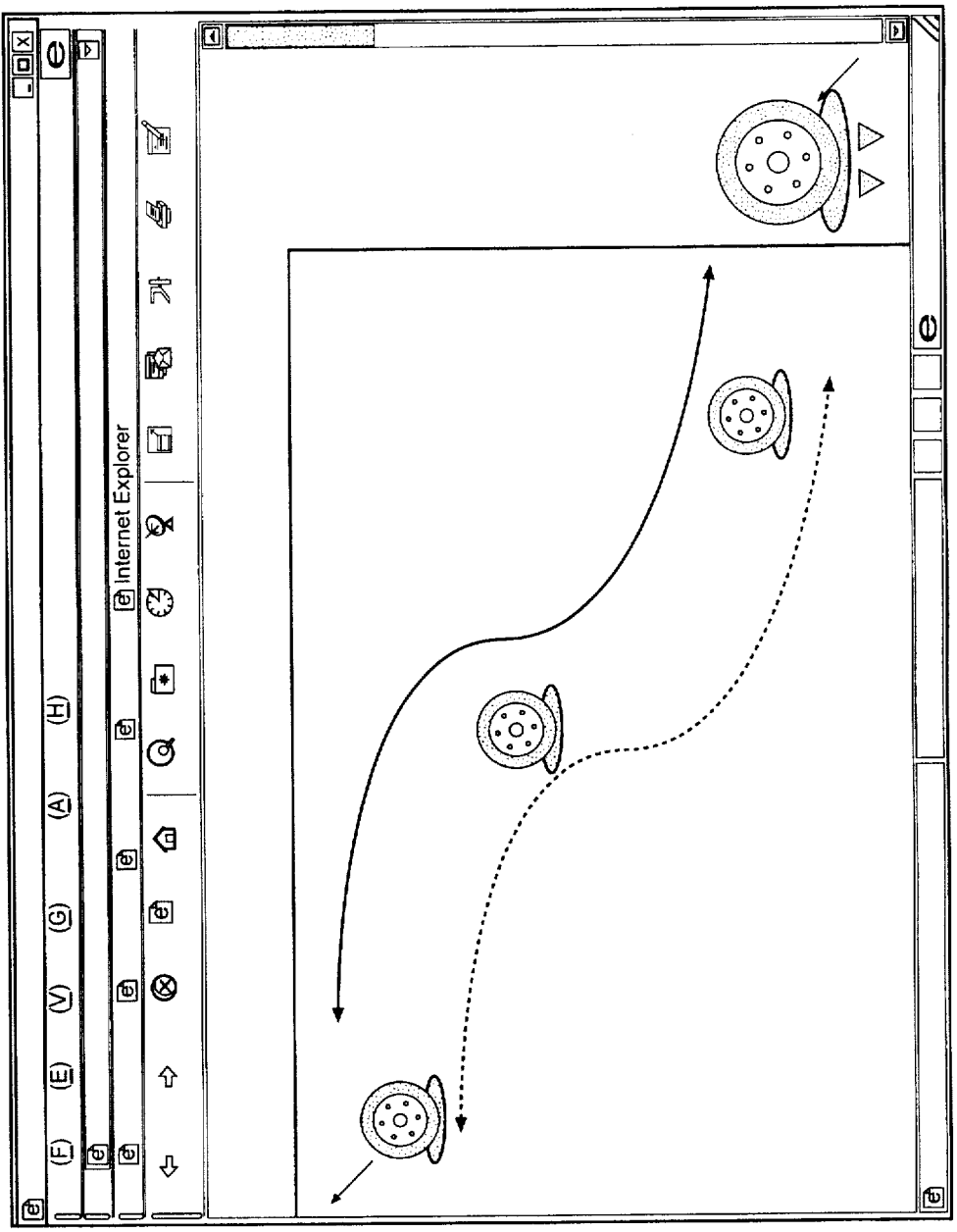
FIG. 12 is a drawing of a computer monitor screen which depicts an embodiment of the invention in which the image drops to the lower corner of a screen and then, jumps back to the pointer after predetermined time period.
Figure 13:
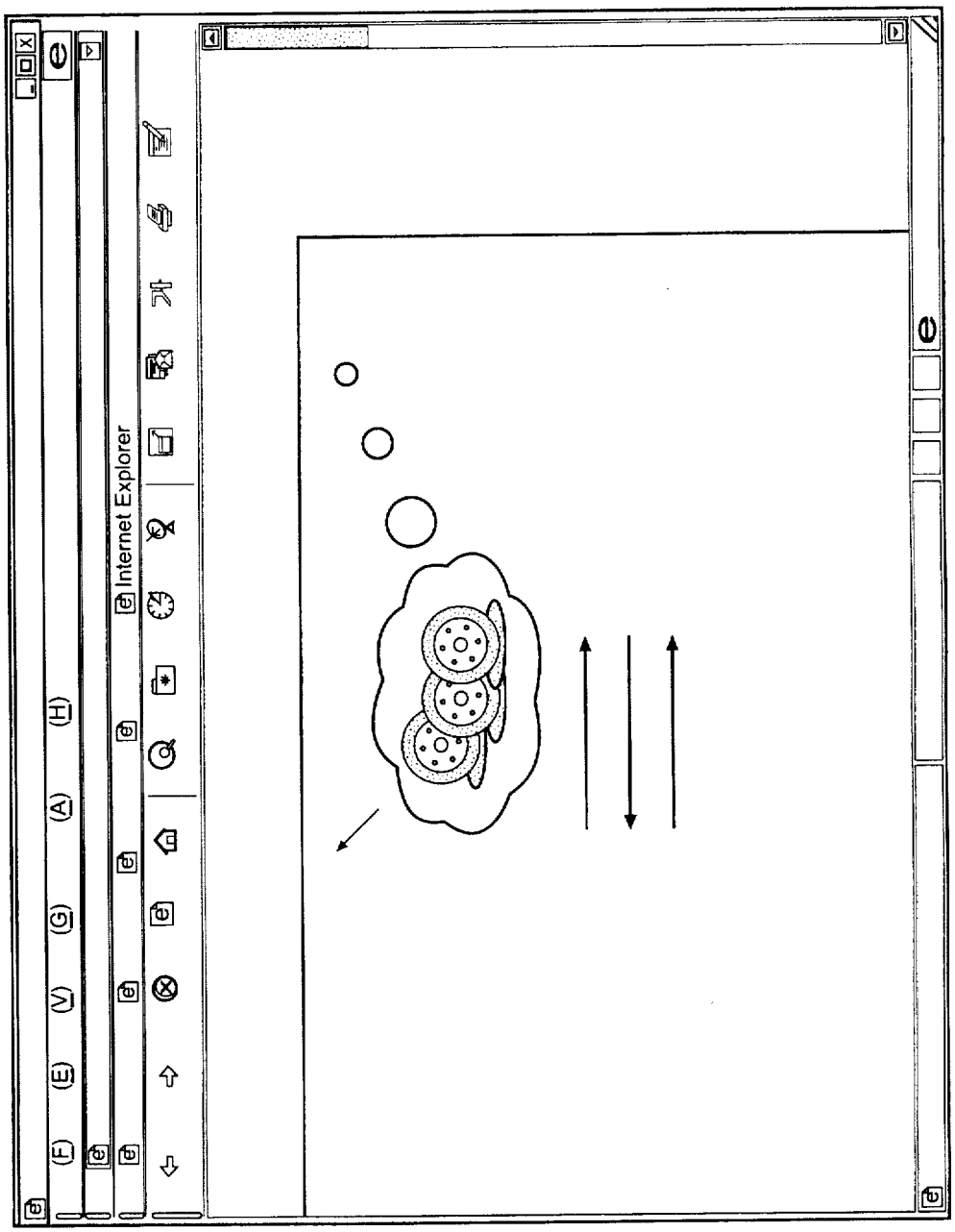
FIG. 13 is a drawing of a computer monitor screen which depicts an embodiment of the invention in which the image disappears after moving the pointer in a quick back and forth lateral direction.
Figure 14:
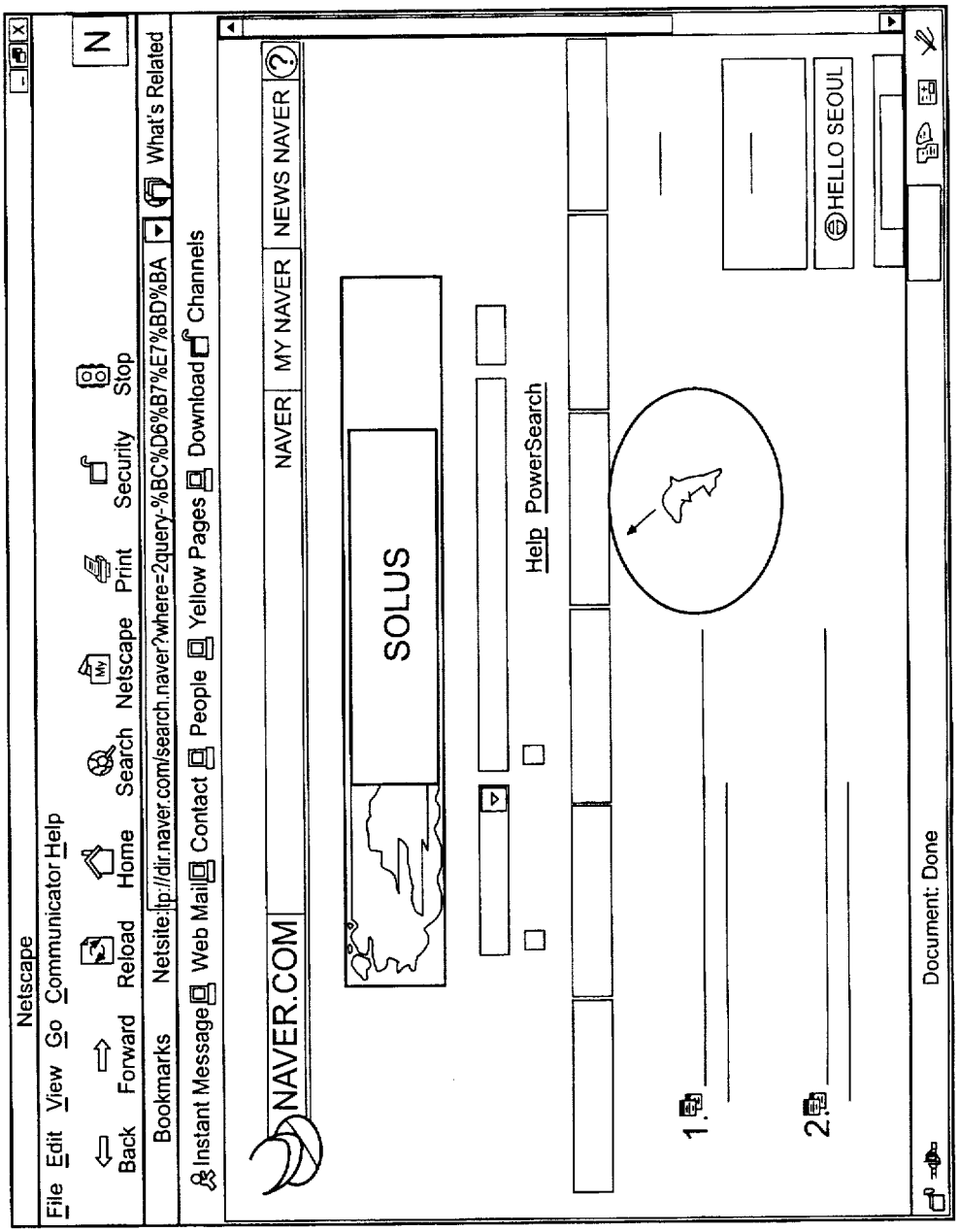
FIG. 14 is a computer monitor screen printout that depicts an embodiment of the invention for a company, namely, Kumho Tire Company.
Figure 15:
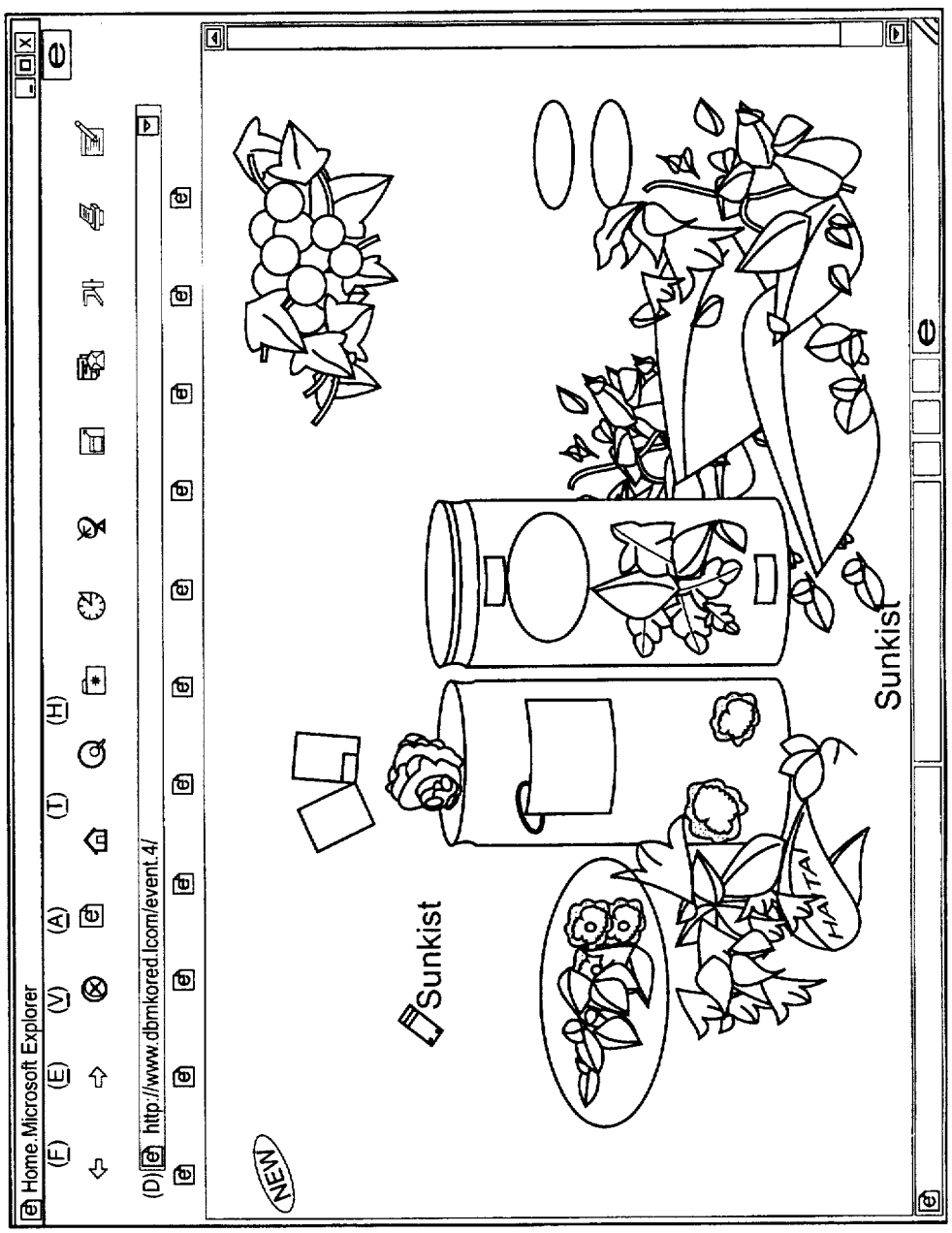
FIG. 15 is an computer monitor screen printout that depicts an embodiment of the invention for a company, namely, Haitai Beverages Company.

FIGS. 10–13 show different embodiments of the invention. FIG. 10 shows an embodiment where layered image information disappears when the user moves the pointer in a circular motion. In this particular embodiment, layered image information is in the shape of a tire. FIG. 11 shows a feature where layered image information disappears when the user moves the pointer in a motion to trace the letter "X". FIG. 12 shows a feature where the layered image information drops to the lower corner of the screen. FIG. 13 further shows a feature where the layered image disappears when the pointer is shook horizontally using the movement of the pointing device. It is once again noted that FIGS. 10–13 are mere representations of different embodiments of the invention and that the scope of this invention is not limited to the examples disclosed in FIGS. 10–13. FIGS. 14–15 show examples of the invention implemented on a client computer. FIG. 14 illustrates an image, namely a dolphin, and logo of a company, called, Kumho Tire Company. FIG. 15 illustrates an image, namely a can, and a brand of the product produced by Haitai Beverages Company.

The pointing device in the present invention is not limited to a conventional mouse and it further includes conventional pointing sticks, graphics tablets, joysticks, light pens, pucks, stylus, trackballs, etc. In each of these types of pointing devices, the user physically moves a component and thus results in the statement that the movement of the pointing device results in the movement of a cursor. However, other pointing devices exist, such as a touch pad in which there is no movement of a component. For example, in a touch pad the user places his or her finger on the surface of the pad and the movement of the finger is sensed by the pad. Nevertheless, for the sake of simplicity and ease of description, whenever the "movement of the pointing device" is referred to herein directly or indirectly, such statement shall include all interactions with a pointing device so that a cursor displayed on the screen of a monitor has a corresponding movement or interaction with a computer operating system.

The invention thus being described, it will be obvious that the same can be varied in many ways and other variations are not to be regarded as a departure from the spirit and scope of the invention and all such modifications are intended to be included within the scope of the claims.

What is claimed is:

1. A system for displaying image information and activities in response to movement of a pointing device that results in a pointer moving along a pointing device path, comprising:

a) analyzing means for analyzing the pointing device path and for matching the pointing device path to a matched predefined oscillating path;

b) matching means for matching an image activity to said matched predefined path to determine a matching image activity; and c) displaying means for displaying layered image information in response to said matching image activity.

2. The system of claim 1, wherein said system is operable under a network environment.

3. The system of claim 1 and further comprising a means for storing a plurality of image information.

4. The system of claim 3, wherein said means for displaying further includes a means for transforming said image information to said layered image information.

5. The system of claim 1, wherein said analyzing means includes a further means for analyzing an activity of said pointing device and for matching the pointing device activity to at least one of a plurality of predefined activities to determine a matched predefined activity; and wherein said matching means is also for matching said image activity to said matched predefined activity to determine said matching image activity.

6. The system of claim 5, wherein a user's pointing device activity includes previous and current movement, click and drag of a cursor or combinations thereof by the user; and wherein the movement of the pointer includes direction and speed.

7. The system of claim 5, wherein said plurality of predefined activities includes a lapse of time regardless of any said pointing device activity.

8. The system of claim 5, wherein said plurality of predefined activities includes a scroll of a working window.

9. The system of claim 5, wherein said plurality of predefined activities includes a location of a pointer within a certain area specified in a working window.

10. The system of claim 1, wherein said plurality of predefined paths includes a path in a shape of an "x".

11. The system of claim 1, wherein said plurality of predefined paths includes a path in a shape of an "O".

12. The system of claim 1, wherein said plurality of predefined paths includes a path in a geometric shape.

13. The system of claim 8, wherein said matching image activity includes a scroll of said layered image information.

14. The system of claim 1, wherein said matching image activity includes change of said layered image information into another layered image information.

15. The system of claim 1, wherein said matching image activity includes disappearance of said layered image information for a certain period of time.

16. The system of claim 15, wherein said matching image activity includes reappearance of said layered image information.

17. The system of claim 1, wherein said matching image activity includes having said layered image information trail a moving pointer at a predetermined distance wherein said layered image is located on a side of said pointer opposite to a direction said pointer is moving.

18. The system of claim 1 further comprising means for providing audio information in response to said matching image activity.

19. The system of claim 1 wherein said oscillating path is in a horizontal direction.

20. A system for displaying image information and activities in response to movement of a pointing device that results in a pointer moving along a pointing device path, comprising:
   a) analyzing means for analyzing the pointing device path and for matching the pointing device path to a matched predefined path;
   b) matching means for matching an image activity to said matched predefined path to determine a matching image activity; and
   c) displaying means for displaying layered image information in response to said matching image activity,
   wherein said matching image activity includes disappearance of said layered image information after said layered image makes a circular trip around the pointer.

21. The method of claim 20 wherein said system is operable under a network environment.

22. The system of claim 20 further comprising means for storing a plurality of image information.

23. The system of claim 20, wherein said means for information to said layered image information.

24. The system of claim 20, wherein said plurality of predefined paths includes a path in a geometric shape.

25. The system of claim 20, wherein said plurality of predefined paths includes a path in a shape of an "X".

26. The system of claim 20, wherein said plurality of predefined paths includes an oscillating path of the pointer.

27. A system for displaying image information and activities in response to movement of a pointing device that results in a pointer moving along a pointing device path, comprising:
   a) analyzing means for analyzing the pointing device path and for matching the pointing device path to a matched predefined path;
   b) matching means for matching an image activity to said matched predefined path to determine a matching image activity; and
   c) displaying means for displaying layered image information in response to said matching image activity,
   wherein said matching image activity includes dropping of said matching image information to a corner of a screen.

28. A system for displaying image information and activities in response to movement of a pointing device that results in a pointer moving along a pointing device path, comprising:
   a) analyzing means for analyzing the pointing device path and for matching the pointing device path to a matched predefined path;
   b) matching means for matching an image activity to said matched predefined path to determine a matching image activity; and
   c) displaying means for displaying layered image information in response to said matching image activity,
   wherein said matching image activity includes repositioning said layered image information from a corner of a screen.

29. A system for displaying image information and activities in response to movement of a pointing device that results in a pointer moving along a pointing device path, comprising:
   a) analyzing means for analyzing the pointing device path and for matching the pointing device path to a matched predefined path;
   b) matching means for matching an image activity to said matched predefined path to determine a matching image activity; and
   c) displaying means for displaying layered image information in response to said matching image activity,
   wherein said matching image activity includes positioning said layered image information at a first position a distance from the pointer on a side of the pointer that is different from a side facing a direction the pointer is moving when the pointer is moving at least at a certain speed.

30. The system of claim 29, wherein said matching image activity further includes changing said layered image information position when the direction of movement of the pointer is towards the first position so that the position of said layered image information is always out of the path of movement of the pointer.

31. The system of claim 30 wherein said layered image information follows the pointer for a certain distance in response to the speed at which the pointer moves.

32. The system of claim 30 wherein when the pointer changes directions said layered image information jumps from a first relative position on a first side of the pointer opposite a first direction the pointer is moving to a second relative position on a second side of the pointer opposite a second direction the pointer is moving.

33. The system of claim 30 wherein said layered image information moves in relation to movement of the pointer.

34. The system of claim 33 wherein when the pointer movement changes direction said layered image information movement changes correspondingly.

35. The system of claim 30, further comprising a change of said layered image information into another layered image information.

36. The system of claim 30, further comprising a movement of said layered image information to a preselected portion a screen in response to a further matching image activity.

37. The system of claim 30, further comprising a movement of said layered image information from a preselected portion of a screen.

38. The system of claim 30, further comprising disappearance of said layered image information in response to a further matching image activity.

39. The system of claim 30, wherein said matching image activity includes disappearance of said layered image information after a certain period of time.

40. The system of claim 30, wherein said matching image activity includes disappearance of said layered image information for a certain period of time.

41. The system of claim 40, wherein said matching image activity includes reappearance of said layered image information.

42. The system of claim 30, wherein said different side is a side opposite the side facing the direction of moving.

43. A method for dynamically and interactively displaying various types of layered image information and activities in response to movement of a pointing device that results in a pointer moving along a pointing device path, comprising steps of;
- a) analyzing the pointing device path in real-time to determine whether the pointing device path matches one of a plurality of predefined oscillating paths;
- b) executing matching image activity in response to the matched predefined path;
- c) displaying the layered image information in response to the matching image activity in real-time;
- d) analyzing a pointing device activity in real-time to determine whether said activity matches one of a plurality of predefined activities;
- e) executing matching image activity in response to the matched predefined path and matched predefined activities; and
- f) displaying layered image information in response to the matching image activity.

44. The method of claim 43 operating under a network environment.

45. The method of claim 43, further comprising, a step of storing a plurality of image information.

46. The method of claim 45, wherein said step of displaying further includes transforming said image information to said layered image information.

47. The method of claim 43, wherein said pointing device activity includes previous and current movement, click and drag of a pointer or combinations thereof; and
- wherein a movement of the pointer includes direction and speed.

48. The method of claim 43, wherein said plurality of predefined activities includes a lapse of time regardless of any said pointing device activity.

49. The method of claim 43, wherein said plurality of predefined activities includes a scroll of a working window.

50. The method of claim 43, wherein said plurality of predefined activities includes a location of the pointer within a certain area specified in a working window.

51. The method of claim 43, wherein said plurality of predefined paths includes a path in the shape of an "x."

52. The method of claim 43, wherein said plurality of predefined paths includes a path in the shape of an "O."

53. The method of claim 43, wherein said predefined paths includes a path in a geometric shape.

54. The method of claim 49, wherein said matching image activity includes a scroll of said layered image information.

55. The method of claim 43, wherein said matching image activity includes change of said layered image information into another layered image information.

56. The method of claim 43, wherein said matching image activity includes disappearance of said layered image information for a predetermined time.

57. The method of claim 56, wherein said matching image activity includes reappearance of said layered image information.

58. The method of claim 43, wherein said matching image activity includes having said layered image information trail a moving pointer at a predetermined distance wherein said layered image is located on a side of said pointer opposite to a direction said pointer is moving.

59. The method of claim 43, wherein said matching image activity includes positioning said layered image information a predetermined distance from the pointer on a side of the pointer opposite to a direction the pointer is moving when the pointer is moving at a certain speed.

60. A method for dynamically and interactively displaying various types of layered image information and activities in response to movement of a pointing device that results in a pointer moving along a pointing device path, comprising steps of;
- a) analyzing the pointing device path in real-time to determine whether the pointing device path matches one of a plurality of predefined paths;
- b) executing matching image activity in response to the matched predefined path; and
- c) displaying the layered image information in response to the matching image activity in real-time,
- wherein said matching image activity includes disappearance of said layered image information after making a trip around the pointer.

61. A method for dynamically and interactively displaying various types of layered image information and activities in response to movement of a pointing device that results in a pointer moving along a pointing device path, comprising steps of;
- a) analyzing the pointing device path in real-time to determine whether the pointing device path matches one of a plurality of predefined paths;
- b) executing matching image activity in response to the matched predefined path; and
- c) displaying the layered image information in response to the matching image activity in real-time,
- wherein said matching image activity includes dropping of said matching image information to a corner of a screen.

62. A method for dynamically and interactively displaying various types of layered image information and activities in response to movement of a pointing device that results in a pointer moving along a pointing device path, comprising steps of;
- a) analyzing the pointing device path in real-time to determine whether the pointing device path matches one of a plurality of predefined paths;
- b) executing matching image activity in response to the matched predefined path; and
- c) displaying the layered image information in response to the matching image activity in real-time,
- wherein said matching image activity includes repositioning said layered image information from a corner of a screen.

63. A system for displaying image information and activities in response to movement of a pointing device that results in a pointer moving along a pointing device path, comprising:
- a) analyzing means for analyzing the pointing device path and for matching the pointing device path to a matched predefined path;
- b) matching means for matching an image activity to said matched predefined path to determine a matching image activity; and
- c) displaying means for displaying layered image information in response to said matching image activity,
- wherein said matching image activity includes a jump of said layered image information from a dropped position to a position near the pointer.

* * * * *